Figures 1, 2, 3:
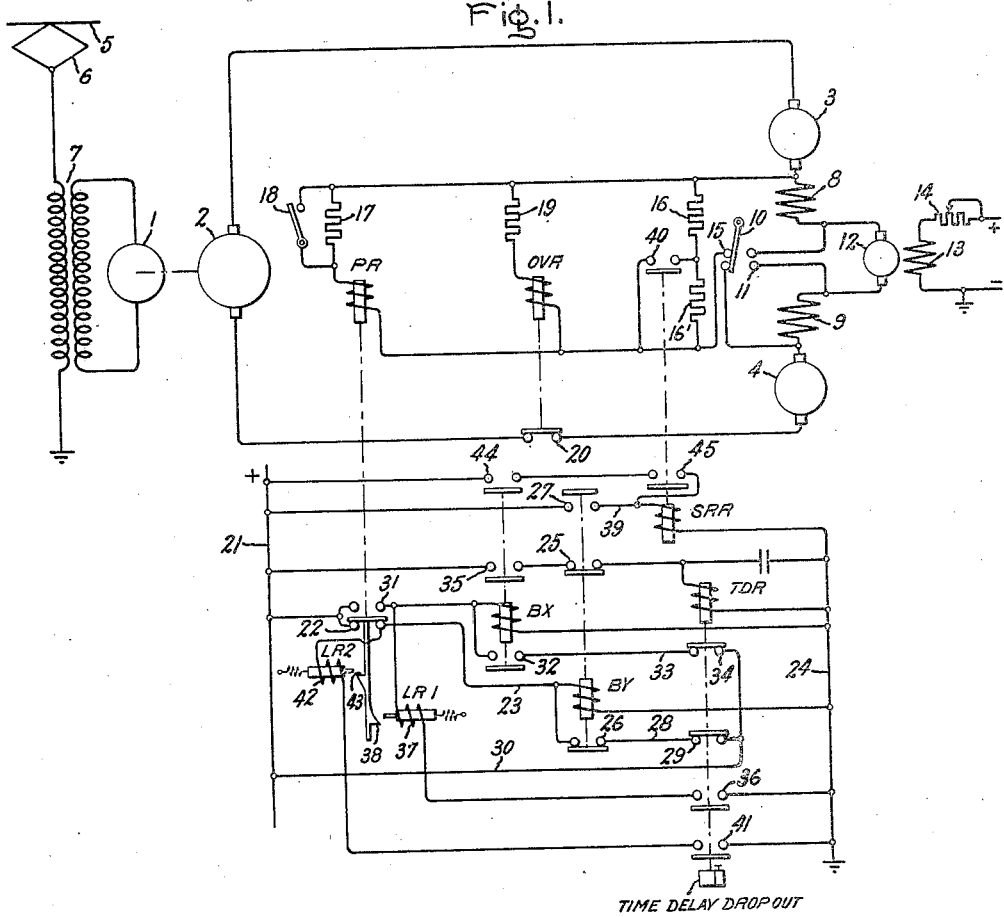

Inventor:
Harold S. Ogden,
by Prowell S. Mack
His Attorney.

Patented Oct. 12, 1948

2,451,237

UNITED STATES PATENT OFFICE 2,451,237

TRACTION MOTOR CONTROL SYSTEM

Harold S. Ogden, Erie, Pa., assignor to General Electric Company, a corporation of New York Application September 18, 1947, Serial No. 774,721

15 Claims. (Cl. 318—84)

My invention relates in general to an automatic control system for variable voltage drives, and in particular to a traction motor control system for direct current locomotives.

While my invention has other applications, it is particularly applicable to railway locomotives adapted for operation from a high voltage alternating current or direct current source which is transformed to low voltage direct current power by means of a motor-generator set mounted within the locomotive structure. It is also equally applicable to straight direct current locomotives which receive their power from a relatively low voltage source, such as an overhead trolley wire.

Motor-generator locomotives have been employed for many years and in connection with this arrangement for supplying electric energy, the use of separate excitation for the traction motor fields when connected for regenerative braking has been employed and found to have certain inherent advantages. The flexibility of field control obtained by the use of a separate exciter has considerably simplified the operation of the locomotive from the engineman's standpoint since it is not necessary to shift from one motor connection to another when changes in grade and speed are encountered. Another simplification lies in the fact that traction motor field shunts are not required since, with separate excitation on the motor fields, a large number of field control steps from full field to weak field are readily obtained by the use of a single controller.

The use of separate excitation for traction motor fields has been primarily confined to its application in connection with regenerative braking. However, I have found that certain advantages may be gained by the use of separate excitation when the locomotive is driving or motoring, particularly in the higher speed ranges. For close control of the motor field weakening operation, this has been found to be highly desirable.

Accordingly, it is an object of my invention to provide an improved traction motor control system.

Another object of my invention is to provide an improved automatic control system for series wound traction motors of a direct current electric locomotive.

It is a further object of my invention to provide an improved automatic control system for a locomotive with D.-C. series motors which employs separate excitation for the drive motors and results in increased operating stability over a wide range of vehicle load and speed.

It is still another object of my invention to provide an improved field strength control system for D.-C. traction motors which, by automatic control of stabilizing resistance in the motor field circuit, permits maximum utilization of motor characteristics in both the series and separately excited motor field connection.

In accordance with one form of my invention, I provide the customary motor-generator power supply, the D.-C. generator being connected in series with a pair of series wound traction motors. Switching apparatus is provided so that the series fields may be reconnected for separate excitation by an auxiliary exciter set and at the same time a stabilizing resistance is inserted in series with the motor armatures and also in series with the reconnected motor fields. Since a fixed value of this resistance will not suffice to produce stable operation of the motors over the complete range of speed and load through which they must operate, additional control and switching means are included which operate upon the approach of the region of motor instability as measured by the ratio of current in the motor armatures to current in the field windings to short out a portion of the stabilizing resistor which, in effect, extends the stable range of operation of the locomotive without requiring any manual change of the main locomotive controller by the operator. The change in value of stabilizing resistance is entirely automatic under the control of a polarized relay and includes time delay switching means associated therewith so that the change takes place in a predetermined timed sequence, and also automatically protects the polarized relay from false operation due to fluctuating or transient voltage conditions caused by the insertion or removal of a portion of the stabilizing resistance from the main power circuit.

For a more complete understanding of my invention, reference should now be had to the accompanying drawing and the specification for a detailed description of the component parts and operation of the system, and the features of novelty therein will be pointed out with particularity in the appended claims. The drawing, Fig. 1, shows the complete control system for a separate excitation connection as applied during motoring conditions to a direct current electric locomotive of the motor-generator set type; Fig. 2 shows certain operating characteristics of the locomotive in the higher speed range; and Fig. 3 is a sequence table showing the order of operation of the automatic control circuit associated with the field stabilized resistance.

Referring now to Fig. 1, I have shown a power circuit for a motor-generator locomotive consisting of an A.-C. drive motor 1 mechanically arranged to drive the D.-C. generator 2 which supplies energy to a pair of traction motor armatures 3 and 4. The A.-C. motor receives its energy from the overhead trolley 5 through a pantograph current collector 6 and through step-down transformer 7. The control circuits and operator's manual controller for the operation of the motor-generator set are not shown since they may be of any conventional form as applied to the motor-generator type of locomotive. The traction motors 3 and 4 are provided with series field windings 8 and 9, respectively, and provision is made by means of the manually operated switch 10 for connecting the motor armatures 3 and 4 and series fields 8 and 9 all in series with the main generator 2 when the switch 10 is thrown to the right, thereby closing the contacts 11. Also in series with the motors 3 and 4 and fields 8 and 9 is the auxiliary exciter 12 which is provided with a separately controlled field winding 13, and for simplicity I have shown a variable resistance 14 in circuit with the field winding 13 and with a direct current energy source for controlling the output of the auxiliary exciter 12. With the switch 10 in the right-hand position, the main power circuit thus completed is a conventional loop circuit for the operation of direct current series motors as applied to an electric locomotive. However, when the switch 10 is thrown to the left-hand position, contacts 11 are opened and contacts 15 are closed which, it will be noted, inserts the stabilizing resistor consisting of two part 16 and 16' in parallel with the circuit consisting of the series field windings 8 and 9 and the auxiliary exciter 12. Under normal operating conditions at low speed, the manual switch 10 will be maintained in the right-hand position, thereby giving normal series motor operation under the control of the operator's main controller. However, in the upper speed ranges, for example above 35 miles an hour, operation is improved if the motor fields are switched to separate excitation by throwing the manual switch 10 to the left-hand position as shown in Fig. 1.

Reference to Fig. 2 will show the results obtained by the operation of the automatic control circuit which maintains the stabilizing resistances 16 and 16' at the proper value to produce a smooth tractive effort curve for each particular position of the main controller in the upper speed ranges. For example, the lower solid line curve A represents the motor characteristics from zero to maximum tractive effort with a fixed value of stabilizing resistance. The same is true for the solid line curves B and C which correspond to random selected positions of the field excitation controller 14. It will be noted that in each case the right ends of these curves level off and then have a tendency to rise as tractive effort increases. Therein lies the instability of the conventional system since it can readily be seen that the driving motors under this condition have a tendency to increase speed with increased load. This results in an electrically unstabe condition in the motor since increased tractive effort should be accompanied by a decrease in speed. However, if the value of the stabilizing resistance is increased at the point where the curves A, B and C commence to flatten out, a new curve is superimposed thereon and this is shown on Fig. 2 by the dotted lines A', B' and C' which illustrate the desirable characteristics obtained by increased stabilized resistance; that is, the general shape of the main tractive effort curve is preserved at its right end, thereby giving a stabilized motor condition wherein increased tractive effort results in decreased speed. The point at which the stabilizing resistance value is changed is the locus line X, Fig. 2, which represents the operating condition when the current flowing in the armature circuit is equal to that flowing in the field winding circuit of the traction motors, and the current in the stabilizing resistor is zero. Thus for operation to the left of the line X, the armature current is less than the field current and for points to the right of line X the reverse situation is true, the armature current being greater than field current. This change in operating condition is detected by means of the polarized relay PR which has its operating coil in series with the resistance 17 and which effectively measures and is responsive to the voltage appearing across the stabilizing resistances 16 and 16'. Since it may be necessary to change the sensitivity of polarized relay PR, switch 18 is provided for short circuiting the calibrating resistance 17 and would normally be connected to operate from the master controller when the position was attained wherein the sensitivity of the PR relay was no longer great enough to insure accurate operation. Also in parallel with the stability resistance 16 and 16' is the relay OVR which has its operating coil in series with the resistance 19 and is thus energized proportionately to the voltage occurring across the stabilizing resistance. This relay functions on the occurrence of an excessive voltage in the stabilizing resistor which, in turn, is indicative of excessive currents in the motor field circuit and operates through its contacts 20 to open the main power circuit from the generator 2 to the traction motors 3 and 4.

The control circuit and switching means by which the stabilizing resistance is adjusted, in accordance with the operation of the polarized relay PR, is most clearly understood by describing the operation of the system at the time the various elements thereof are pointed out in detail. In general, the control circuit consists of the operating contacts of the relay PR, a pair of auxiliary relays BX and BY, a time delay relay TDR and the stabilizing resistance change contactor SRR, all of which are supplied with direct current from the positive side 21 of the control power source.

Assuming that the traction motor field current is less than the armature current, as shown by step 0 on the sequence table of Fig. 3 and as represented by operation on curve A', for example, in Fig. 2, the voltage across the stabilizing resistance which is applied to the polarized relay PR will be of the incorrect polarity to cause PR to pick up. This condition is represented by the position of relay PR in Fig. 1 as well as the operating positions of the other control circuit elements of Fig. 1. With the relay PR de-energized as described, its contacts 22 are closed thereby completing the circuit through conductor 23, the operating coil of auxiliary relay BY and the negative line conductor 24 of the control power source. Hence, relay BY is picked up closing its normally open contacts 25 and 26 and opening its normally closed contact 27. It will be noted that auxiliary relay BY is also maintained in the picked-up position by the circuit including the sealing contact 26, conductor 28, normally closed contact 29 of relay TDR and conductor 30. This condition corresponds to sequence step 0 where only the relay BY is energized.

As the current flowing in traction motor field circuit increases due to increased excitation on the exciter 12, the ratio of field current to armature current becomes greater than 1 and potential of the correct polarity appears across the stabilizing resistances 16 and 16' and is applied to the operating coil of the polarized relay PR. This relay then picks up (step 1), closing its normally open contacts 31 which energizes the operating coil for the auxiliary relay BX as shown on step 2 of Fig. 3. However, the opening of contact 22 does not de-energize auxiliary relay BY due to the sealing circuit through its contact 26 and contact 29 of the TDR relay and conductor 30. In a like manner, auxiliary relay BX is provided with sealing contact 32 which closes to maintain relay BX energized through the circuit consisting of the conductors 33 and the normally closed contact 34 of relay TDR and conductor 30, back to the source of control power. As shown in step 3 of the sequence table, when the relay BX picks up, its normally open contact 35 completes a circuit to the operating coil of the time delay relay TDR through the normally closed contact 25 of relay BY. As soon as time delay relay TDR picks up, the sealing circuit through its normally closed contact 29 is opened and relay BY drops out, as shown in step 4, thereby de-energizing TDR and starting its timing action. At the same time that relay TDR picks up, a circuit is completed through its normally open contact 36 to the energizing coil 37 of the locking relay LR1, energizing this relay to a position of engagement with the lower abutment 38 on the contact arm of relay PR and thereby acting to maintain relay PR in the closed position, as shown on step 5 of Fig. 3. At the time that contactor BY drops out a circuit is completed through its normally closed contact 27 and conductor 39 to the operating coil of the stabilizing resistance contactor SRR, thereby energizing this contactor and closing its normally open contacts 40 to shunt or short circuit the portion 16' of the stabilizing resistance. This operation gives the desired new value of stabilizing resistance ohms for the present operating condition. The function of the locking relay LR1 is to insure that the polarized relay PR remains in the picked-up position during the change in stabilizing resistance value so that transients or voltage fluctuations in the stabilizing resistance circuit will not produce a false operation of this relay. The contactor SRR therefore remains energized after the timing operation of TDR has been completed and transient conditions have passed, at which time TDR returns to its de-energized position and locking relay LR1 is deenergized. This is illustrated in step 7 of Fig. 3 and represents the completion of a cycle of operation of the control system under the foregoing assumed operating conditions. As long as the current in the field circuit remains greater than that in the armature circuit, potential of the proper polarity will be applied to the polarized relay PR, maintaining it in the closed position and maintaining the stabilizing resistance contactor SRR energized to short out portion 16 of the stabilizing resistance in the motor field circuit. Operation under these conditions is represented on Fig. 2 by the portion of the curves A, B, or C, as the case may be, to the left of the unity ratio, line X.

Assuming now that the operating conditions of the locomotive have changed due to change of load or track gradient and that the armature current flowing in the traction motor armature circuit increases until it becomes equal to or slightly less than the motor field current, this corresponds to a condition of operation along the line A of Fig. 2, moving toward the right to its intersection with the 1:1 ratio locus line X of armature amperes-to-field amperes. When the currents in the field and armature circuits become equal, the voltage produced across the stabilizing resistance 16 becomes zero since the currents in this resistance are then equal and opposite, and the polarized relay PR is deenergized, returning to its drop-out position. This closes contact 22 which energizes the auxiliary relay BY, picking up this relay. However, the other auxiliary relay BX does not drop out since it is maintained energized through its sealing contact 32 and conductor 33 and normally closed contact 34 of the time delay relay TDR. This operation is shown on step 8 of the sequence table, Fig. 3. As soon as auxiliary relay BY picks up, its contacts 25 are closed and since the relay BX is still energized, contacts 35 are also closed and the circuit is thereby completed to energize the coil of time delay relay TDR which picks up as shown in step 9, Fig. 3. The operation of TDR opens the auxiliary contacts 34 of this relay, thereby interrupting the sealing circuit for the auxiliary relay BX and this auxiliary relay drops out. At the same time that time delay relay TDR picks up, the circuit is completed through the auxiliary contact 41 of this relay which energizes the operating coil 42 of the locking relay LR2 to maintain a position of engagement with the upper abutment 43 of the relay PR. This operation is shown in step 10, Fig. 3. The PR relay is thus held in the deenergized position as long as the time delay relay is energized or during its timed drop-out period. Since the stabilizing resistance contactor SRR has been maintained closed by current flowing through contact 44 of auxiliary relay BX and the sealing contact 45 of the stabilizing resistance contactor, the deenergization of auxiliary relay BX in step 10, opens this circuit, interrupting the circuit to contactor SRR, and this contactor returns to its deenergized position which opens its contacts 40, thereby inserting the portion 16' of the stabilizing resistance in series with the resistance 16. The stabilizing resistance is thus restored to its maximum ohmic value. This condition is shown in step 11, Fig. 3, and at the same time the drop-out of relay BX deenergizes the time delay relay TDR, starting its timing cycle. At the close of its timing period it drops out, de-energizing the locking relay LR2 (step 12). Upon the drop-out of TDR, component parts of the control system have been restored to the initial conditions as shown in step 0 of Fig. 3. Operation of the main power circuits of the locomotive is again represented by the portion of the curves A', B' or C' to the right of the unity ratio line X, and the maximum value of stabilizing resistance 16 and 16' has been inserted in the traction motor field circuit.

The operation of the circuit effectively to change the amount of stabilizing resistance at the proper point to maintain a smooth tractive effort curve, as shown in Fig. 2, is entirely automatic and operation is dependent only upon the electrical conditions of the traction motor armature and field circuits. Thus, the main power circuits and traction motors are maintained in an electrically stable condition irrespective of the care or attention given by the locomotive operator. It will also be apparent that while the system has been illustrated and described as applied to a locomotive of the alternating current-direct current motor generator type, it is readily adaptable to a straight D.-C. locomotive receiving its power from an external direct current source by means of third rail or trolley, since the component parts and their operation are concerned only with the D.-C. traction motors and necessary control for properly adjusting field current and stabilizing resistance. The remainder of the locomotive power circuits are in no way affected by the application of my invention. Another point that should be emphasized is that in Fig. 1 of the drawing I have illustrated only one pair of traction motors, whereas in the customary electric locomotive there may be any desired number of pairs of traction motors, depending on the number of driving axles and the total output rating desired. Thus my system should be applied to each pair of driving motors and is not limited to a locomotive having only one pair of driving motors as schematically illustrated in Fig. 1.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A traction motor control system for direct current locomotives comprising, a pair of traction motors each having an armature and a field winding connected in series with each other and with a main source of power, a direct current exciter for supplying energy to said field windings, an adjustable stabilizing resistance, switching means for connecting said field windings in series with said exciter and said resistance and for inserting said resistance in series with said motor armatures, and means responsive to the ratio of current in said armature circuit to the current in said series field winding circuit for changing the value of said stabilizing resistance.

2. A traction motor control system for direct current locomotives comprising, a pair of traction motors each having an armature and a field winding connected in series with each other and with a main source of power, a direct current exciter for supplying energy to said field windings, an adjustable stabilizing resistance, switching means for connecting said field windings in series with said exciter and said resistance and for inserting said resistance in series with said motor armatures, and control means responsive to the ratio of current in said armature circuit to the current in said series field winding circuit and effective when said ratio differs from unity for changing the ohmic value of said stabilizing resistance.

3. A traction motor control system for direct current locomotives comprising, a pair of traction motors each having an armature and a field winding connected in series with each other and with a main source of power, a direct current exciter for supplying energy to said field windings, an adjustable stabilizing resistance, switching means for connecting said field windings in series with said exciter and said resistance and for inserting said resistance in series with said motor armatures, means including an electromagnetic relay responsive to the ratio of current in said armature circuit to the current in said series field winding circuit for changing the value of said stabilizing resistance, and time delayed locking means for said electromagnetic relay for preventing false operation of said relay due to transient voltages across said stabilizing resistance.

4. A traction motor control system for direct current locomotives comprising, a pair of traction motors each having an armature and a field winding connected in series with each other and with a main source of power, a direct current exciter for supplying energy to said field windings, an adjustable stabilizing resistance, switching means for connecting said field windings in series with said exciter and said resistance and for inserting said resistance in series with said motor armatures, means including a polarity sensitive electromagnetic relay responsive to the ratio of current in said armature circuit to the current in said series field winding circuit for changing the value of said stabilizing resistance, and locking means for said electromagnetic relay effective for a predetermined time interval to prevent false operation of said relay due to transient voltages across said stabilizing resistance.

5. A traction motor control system for locomotives comprising, a pair of traction motors each having an armature and a field winding connected in loop circuit relationship with a main source of power, an auxiliary exciter for supplying energy to said field windings, an adjustable stabilizing resistance, switching means for connecting said field windings in series with said exciter and said resistance and for inserting said resistance in series with said motor armatures, and means operable in response to an excess of field winding circuit current over armature circuit current for decreasing the ohmic value of said stabilizing resistance.

6. A traction motor control system for locomotives comprising, a pair of traction motors each having an armature and a field winding connected in loop circuit relationship with a main source of power, an auxiliary exciter for supplying energy to said field windings, an adjustable stabilizing resistance, switching means for connecting said field windings in series with said exciter and said resistance and for inserting said resistance in series with said motor armatures, relay means operable in response to an excess of field winding circuit current over armature circuit current for decreasing the ohmic value of said stabilizing resistance, and electromagnetic means with time delay operation for rendering said relay means inoperable for a predetermined period of time after said resistance value has been changed.

7. A traction motor control system for locomotives comprising, a pair of traction motors each having an armature and a field winding connected in loop circuit relationship with a main source of power, an auxiliary exciter for supplying energy to said field windings, an adjustable stabilizing resistance, switching means for connecting said field windings in series with said exciter and said resistance and for inserting said resistance in series with said motor armatures, means operable in response to an excess of field winding circuit current over armature circuit current for decreasing the ohmic value of said stabilizing resistance, and overload relay means responsive to excessive current in said stabilizing resistance for disconnecting said motors from said main source of power.

8. A traction motor control system for locomotives comprising, a pair of traction motors each having an armature and a field winding connected in loop circuit relationship with a main source of power, an auxiliary exciter for supplying energy to said field windings, an adjustable stabilizing resistance, switching means operable in one position for connecting said field windings in series with said exciter and said resistance and for inserting said resistance in series with said motor armatures and in a second position for disconnecting said exciter and said resistance and establishing said loop circuit relationship, and means operable in said first position of said switching means in response to an excess of armature circuit current to field winding circuit current for increasing the ohmic value of said stabilizing resistance.

9. A traction motor control system for locomotives comprising, a pair of traction motors each having an armature and a field winding connected in loop circuit relationship with a main source of power, an auxiliary exciter for supplying energy to said field windings, an adjustable stabilizing resistance, switching means for connecting said field windings in series with said exciter and said resistance and for inserting said resistance in series with said motor armatures, a polarity sensitive relay in parallel with said resistance, and control means energized by operation of said relay and effective to modify the ohmic value of said stabilizing resistance.

10. A traction motor control system for locomotives comprising, a pair of traction motors each having an armature and a field winding connected in loop circuit relationship with a main source of power, an auxiliary exciter for supplying energy to said field windings, an adjustable stabilizing resistance, switching means for connecting said field windings in series with said exciter and said resistance and for inserting said resistance in series with said motor armatures, a polarity sensitive relay in parallel with said resistance, control means energized by operation of said relay and effective to modify the ohmic value of said stabilizing resistance, and an electromagnetic device responsive to a predetermined maximum potential across said resistance for interrupting the power flow in said loop circuit.

11. An electric vehicle traction motor control system for a locomotive having at least one pair of traction motors connected to operate in series circuit relationship from a source of direct current power, a field winding for each motor, means for separately exciting said field windings, an adjustable stabilizing resistance in circuit and arranged so that motor current and field excitation current flow therethrough in opposite directions, relay means responsive to a definite polarity of the potential appearing across said resistance, and control means energized by said relay means for modifying the ohmic value of said stabilizing resistance.

12. An electric vehicle traction motor control system for a locomotive having at least one pair of traction motor armatures connected to operate in series circuit relationship from a source of direct current power, a field winding for each motor, means for separately exciting said field windings, an adjustable stabilizing resistance in circuit and arranged so that motor armature current and field excitation current flow therethrough in opposite directions, relay means responsive to an excess of armature current over field excitation current in said resistance, and control means energized by said relay means for increasing the ohmic value of said stabilizing resistance.

13. An electric vehicle traction motor control system for a locomotive having at least one pair of traction motor armatures connected to operate in series circuit relationship from a source of direct current power, a field winding for each motor, means for separately exciting said field windings, an adjustable stabilizing resistance in circuit and arranged so that motor armature current and field excitation current flow therethrough in opposite directions, relay means responsive to an excess of field excitation current over armature current in said resistance, and control means energized by said relay means for decreasing the value of said stabilizing resistance.

14. An electric vehicle traction motor control system for a locomotive having at least one pair of traction motors connected to operate in series circuit relationship from a source of direct current power, a field winding for each motor, means for separately exciting said field windings, an adjustable stabilizing resistance in circuit and arranged so that motor current and field excitation current flow therethrough in opposite directions, relay means responsive to a definite polarity of the potential appearing across said resistance, control means energized by said relay means for modifying the ohmic value of said stabilizing resistance, and time delay means coacting with said relay to prevent further operation of said relay for a predetermined period of time after energization of said control means.

15. An electric vehicle traction motor control system for a locomotive having at least one pair of traction motors connected to operate in series circuit relationship from a source of direct current power, a field winding for each motor, means for separately exciting said field windings, an adjustable stabilizing resistance in circuit and arranged so that motor current and field excitation current flow therethrough in opposite directions, relay means responsive to a definite polarity of the potential appearing across said resistance, control means energized by said relay means for modifying the ohmic value of said stabilizing resistance, time delay means coacting with said relay to prevent further operation of said relay for a predetermined period of time after energization of said control means, and a voltage-sensitive device in parallel with said resistance and operable to disconnect said motors from the source of power upon occurrence of a predetermined maximum voltage across said resistance.

HAROLD S. OGDEN.

No references cited.